United States Patent [19]

Persson

[11] Patent Number: 4,809,902
[45] Date of Patent: Mar. 7, 1989

[54] METHOD OF WELDING USING PARTICLE ACCELERATION

[75] Inventor: Ingemar Persson, Nora, Sweden

[73] Assignee: Exploweld AB, Nora, Sweden

[21] Appl. No.: 125,212

[22] Filed: Nov. 25, 1987

[30] Foreign Application Priority Data

Nov. 26, 1986 [SE] Sweden ............................. 8605076

[51] Int. Cl.$^4$ ............................................. B23K 20/08
[52] U.S. Cl. ...................................... 228/107; 228/2.5
[58] Field of Search ............................. 228/107–109, 228/2.5

[56] References Cited

U.S. PATENT DOCUMENTS 3,987,529  10/1976  Nakagawa et al. ................ 228/107

FOREIGN PATENT DOCUMENTS 3420935  12/1984  Fed. Rep. of Germany ...... 228/107
274481   11/1927  United Kingdom ................ 228/107
2117007  10/1983  United Kingdom ................ 228/107

Primary Examiner—Nicholas P. Godici
Assistant Examiner—Samuel M. Heinrich
Attorney, Agent, or Firm—Nies, Webner, Kurz & Bergert

[57] ABSTRACT

The invention relates to a method for welding different materials. An adapted quantity of additive material in the form of particles (3) is accelerated with the aid of an explosive charge (1) and a propulsion element (2) to a high velocity down into a joint space (8), where the particles collide with the workpieces (4, 5) and bond thereto and to themselves.

12 Claims, 1 Drawing Sheet

METHOD OF WELDING USING PARTICLE ACCELERATION

The present invention relates to a method of welding by means of particle acceleration.

BACKGROUND OF THE INVENTION

It is known from the field of explosion welding that if a metal plate is accelerated to a high velocity and permitted to collide with another metal plate under certain given conditions the two plates will be joined together through a band of high mechanical strength.

It is also known to weld together, e.g., pipes in the production of pipelines.

All of these known methods, however, require the workpieces concerned to overlap one another.

This means that conventional fusion-welding control methods can not be applied and that the joint construction in its entirety becomes more complicated. With regard to pipelines, new problems relating, e.g., to disturbances in flow and the risk of crevice corrosion are also likely to occur.

SUMMARY OF THE INVENTION

The present invention relates to a completely novel welding method which provides a weld joint of more conventional configuration while at the same time affording the advantages obtained with explosion welding techniques, i.e. such advantages as solely slight heating of the basic material, insignificant thermic melting of the weld material and a lower dependency on the skill and fitness of the welder.

The present invention thus eliminates the aforesaid drawbacks and also affords in general a highly advantageous welding method.

The present invention thus relates to a method for welding together two workpieces, such as when joining pipes, in which the mutually facing surfaces of the workpieces are bevelled or chamfered in a manner such as to form, when said workpiece surfaces are brought together, a V-shaped groove which is intended to be filled with an additive material, or weld material, in conjunction with the welding operation, and is characterized in that the additive material consists of particles which are caused to accelerate to a high velocity under the forces generated by an explosive charge located externally of the particles in relation to the groove, so that the particles bind to said workpiece surfaces and so that a pregressive build-up of sequential particles is obtained, and in that the total volume of particles corresponds to the groove volume to be filled in said V-shaped groove, therewith resulting in a weld joint between the two workpieces.

BRIEF DESCRIPTION OF THE DRAWING

The present invention will now be described in more detail with reference to an exemplifying embodiment thereof illustrated in the accompanying drawing, in which.

DESCRIPTION OF BOTH EMBODIMENTS

Figure 1:
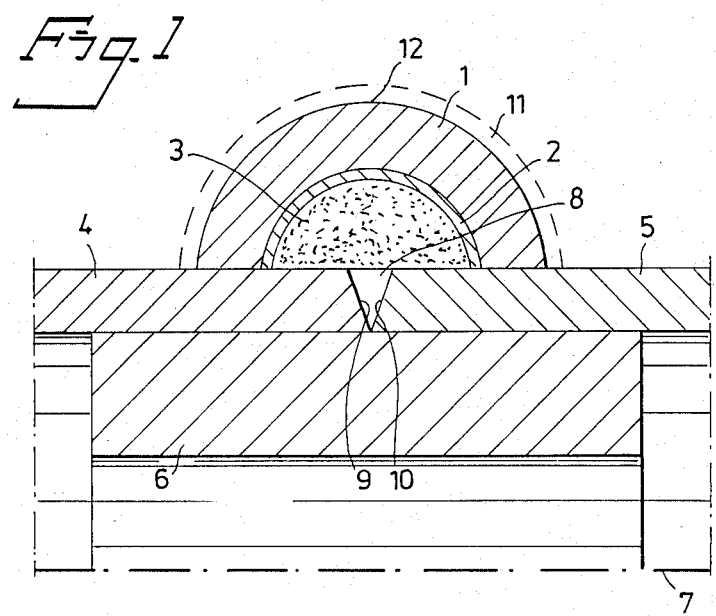
FIG. 1 is a sectional view of a first structural arrangement according to the invention.
Figure 2:
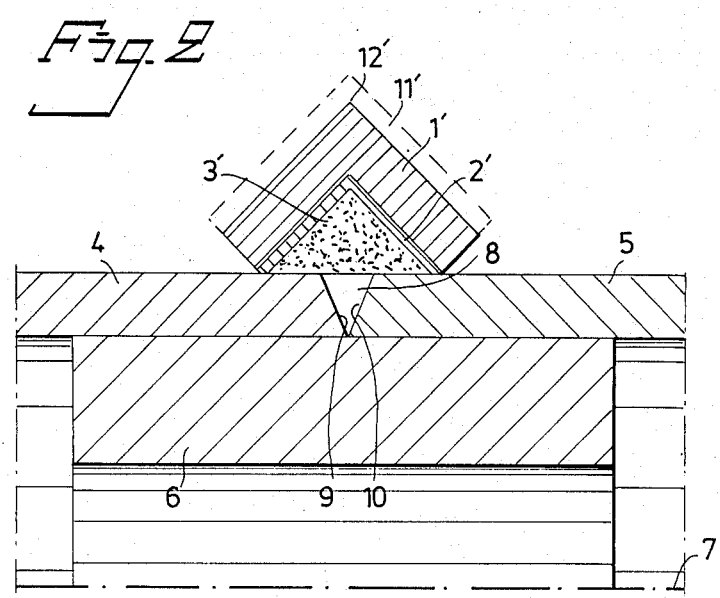
FIG. 2 is a sectional view of a second structural arrangement according to the invention.

FIGS. 1 and 2 illustrate two workpieces 4, 5 which are to be joined together. Although the workpieces may have any shape or form whatsoever, the following description of the invention is made with reference to the joining of two pipes, e.g. in the production of pipelines. The reference 4 identifies part of the wall of one pipe, whereas the reference 5 identifies a part of the wall of the other pipe.

The line 7 represents the longitudinal symmetry axis of the pipes, and hence the remaining parts in the Figures are axially symmetrical about this axis.

The mutually facing surfaces of the workpieces 4, 5 are chamfered or bevelled so as to define a V-shaped groove 8 when brought into abutment with one another, as shown in the Figures. The groove is intended to accommodate an additive material, so as to produce a weld between the workpieces.

According to the invention the additive material consists of particles 3; 3' which are caused to accelerate to a high velocity, by the forces generated by an explosive charge 1; 1' located externally of the particles 3; 3', and therewith to collide with the chamfered surfaces 9, 10 of the workpieces 4, 5 and bind thereto. Furthermore, the chamfered surfaces are progressively built-up by successive particles i.e. particles which land in the groove after the chamfered surfaces have been covered with particles. The groove is filled to the extent desired, therewith to form a weld between the two workpieces 4, 5. The total particle volume corresponds to the extent to which the V-shaped groove is to be filled.

According to one preferred embodiment of the invention a propulsion element in the form of a wall 2, 2' is placed between the particles and the explosive substance. The wall is preferably made of steel and will have a thickness of, e.g., 1–4 mm, preferably 3 mm.

As shown in the drawing, the workpieces 4 and 5 are placed with the chamfered surfaces in abutment with one another to form a weld gap 8, and are preferably supported by a holding-up device or dolly 6. The particle accelerator, comprising the explosive charge 1' and the propulsion element 2; 2' is pressed in towards its axis of symmetry, wherewith the particles are accelerated to a high velocity down into the weld gap, under the influence of the forces generated through the propulsion element.

The particles collide with the weld surfaces of the workpieces under high pressure, therewith resulting in plastic flow in the particulate material and also in those parts of the weld surfaces with which the particles collide. The resultant bonding effect is achieved in a manner similar to that achieved with explosion welding techniques. The same bonding effect is achieved when fresh particles collide with the bonded particles, therewith progressively filling the weld space to the extent desired.

It can be mentioned by way of example that FIG. 1 is drawn relatively to scale when the workpieces are made of steel and have a wall thickness of ca 25 mm.

The holding-up element 6 is preferably made of steel.

Detonation of the explosive charge 1, 1' is initiated on the outer surface of said charge at a location around its periphery. A suitable location in this regard is identified by references 12; 12' in the Figures.

According to one preferred embodiment the particles have a diameter of about 0.1 to 1.0 mm, preferably 0.3 to 0.6 mm. The particles are also preferably spherical.

The particle accelerator may be constructed in various ways, c.f. FIGS. 1 and 2, and is placed either in direct contact with the workpieces or at a distance therefrom.

In the case of the embodiment illustrated in FIG. 1, both the population element 2 and the explosive charge have a semi-circular configuration when seen in cross-section. The elements 1, 2 and 3 will, of course, extend around the full circumference of the pipe joint 8, 9, 10.

In the case of the embodiment illustrated in FIG. 2, both the propulsion element 2' and the explosive charge 1', 1 have a cross-sectional configuration defined by two rectilinear sections which form an angle of 90°, the particles 3+ being located between the outer surfaces of the workpieces and the two rectilinear sections.

The embodiment illustrated in FIGS. 1 and 2 enable the V-shaped groove to be filled without generating a cutting beam of particles.

The function is greatly dependent on the explosive impulse engendered by the explosive charge in relation to the quantity of particles present and the configuration of the propulsion element. By varying these parameters, the particle velocity and the width of the particle beam can be adapted to the prevailing join or weld problem. Extreme limit values in one direction can reuslt in a cutting beam of particles and in the other direction in compaction of the particles in the actual accelerator.

The explosive substance used may be one of a variety of such substances, e.g. PETN, trinitrotoluene, etc.

According to one preferred embodiment of the invention the weight ratio of explosive substance to particles is 1:2 to 1:8, preferably 1:5.

It may also be beneficial to provide a blast absorbing device 11; 11' of known kind around the outside of the explosive charge, as illustrated in broken lines in FIGS. 1 and 2.

The shape and size of the particles also have an influence on the quality of the joint or weld. As beforementioned, the particles are preferably spherical and preferably have the aforesaid size.

According to one preferred embodiment, the chamfered surfaces form an angle of from 85°–35°, preferably about 60°, in the main extension plane of the workpieces.

It will be understood that with some types of joins and materials an advantage can be gained by raising the temperature, either by preheating the workpieces and-/or the particulate material, or by introducing a gas of high ionization temperature, e.g., argon, to the particle capsule.

It may be beneficial to evacuate or purge the particle capsule, particularly in the case of material having a low melting temperature, since, as a result of the compression of gas, e.g. air, between the particles the passage of shock waves may generate heat in such quantities as to cause the material to melt.

The invention can be applied with various types of material.

According to one application of the invention both the additive material, i.e. the particles, and the workpieces are metallic. When producing a weld which is to correspond to a convention weld, the composition of the additive material may correspond to that of a conventional weld electrode in relation to the composition of the workpieces.

According to another application both the additive material and the workpieces consist of a ceramic material.

Alternatively, either one of the additive material and the workpieces may be metallic and the other ceramic.

According to a further application both the additive material and the workpieces may consist of a plastics material.

The invention shall not be considered to be limited to the illustrated embodiments, since, inter alia, the configuration of the propulsion element and the explosive charge can be different to that shown in the drawing. Furthermore, the invention can be applied to join planar workpieces or workpieces which exhibit double-curves.

Consequently, the illustrated embodiments do not restrict the present invention, since modifications can be carried out wihtin the scope of the following claims.

I claim:

1. A method for welding together two workpieces in which the mutually facing surfaces of the workpieces are chamfered so that when the surfaces are brought together there is formed a V-shaped groove which will receive an additive material during the process of welding said workpieces, the method comprising: using additive material consisting of particles (3, 3'); positioning said particles adjacent said groove; causing said particles, by exploding an explosive charge (1; 1') located adjacent and externally of particles (3; 3') in relation to said groove (8), to accelerate to a high velocity and to collide with the chamfered surface (9, 10) of the workpieces (4, 5) so that particles (3: 3"are bonded to said surfaces and so that a progressive bonded build-up of sequential particles is obtained; and whereby the total volume of particles (3; 3') used corresponds to the extent to which the V-shaped groove (8) is intended to be filled, therewith to obtain a weld between the two workpieces (4, 5).

2. A method according to claim 1, further comprising placing a propulsion element (2; 2') in the form of a metal wall between the particles (3; 3') and the explosive substance.

3. A method according to claim 1, further comprising using particles (3; 3') having a diameter of about 0.1 to 1.0 mm.

4. A method according to claim 3, wherein said particles (3; 3') have a diameter within 0.3 to 0.6 mm.

5. A method according to claim 1, further comprising employing a weight ratio of explosive substance (1; 1') to particles (3; 3') of between 1:2 to 1:8.

6. A method according to claim 5, wherein said weight ratio of explosive substance (1; 1') to particles (3; 3') is 1:5.

7. A method according to claim 1, further comprising chamfering each of the surfaces (9, 10) so as to form an angle of 85°–35° to the main extension plane of the workpieces.

8. A method according to claim 7, wherein the surfaces (9, 10) are chamfered so that each chamfered surface forms an angle of approximately 60° to the main extension plane of the workpieces.

9. A method according to claim 1, further comprising that both the additive material (3; 3') and the workpieces (4, 5) are metallic.

10. A method according to claim 1, further comprising that both the additive material (3; 3') and the workpieces (4, 5) consist of a ceramic material.

11. A method according to claim 1, further comprising that either one of the additive material (3; 3') and the workpiece (4, 5) are metallic and the other ceramic.

12. A method according to claim 1, further comprising that both the additive material (3; 3') and the workpieces (4, 5) consist of a plastics material.

* * * * *